Oct. 14, 1924.

M. M. McGEARY ET AL 1,512,003

SUPPORT AND CARRIER FOR FIRE HOSE

Filed March 2, 1923

Inventors
Maurice M. McGeary,
Arthur J. Diefenbach,
By Eccleston & Eccleston.
Attorneys Patented Oct. 14, 1924.

1,512,003

UNITED STATES PATENT OFFICE.

MAURICE M. McGEARY AND ARTHUR J. DIEFENBACH, OF JOHNSTOWN, PENNSYLVANIA.

SUPPORT AND CARRIER FOR FIRE HOSE.

Application filed March 2, 1923. Serial No. 622,314.

*To all whom it may concern:*

Be it known that we, MAURICE M. McGEARY and ARTHUR J. DIEFENBACH, residing at Johnstown, in the county of Cambria and State of Pennsylvania, have invented certain new and useful Improvements in Supports and Carriers for Fire Hose, of which the following is a full, clear, and exact description.

Our invention relates to a combined support and carrier for fire hose, and has for its object the provision of a simple and inexpensive device which may be quickly and securely attached to a fire hose for carrying or dragging the same along the street, and also for supporting the same from the rung of a ladder or other place desired.

Figure 1:
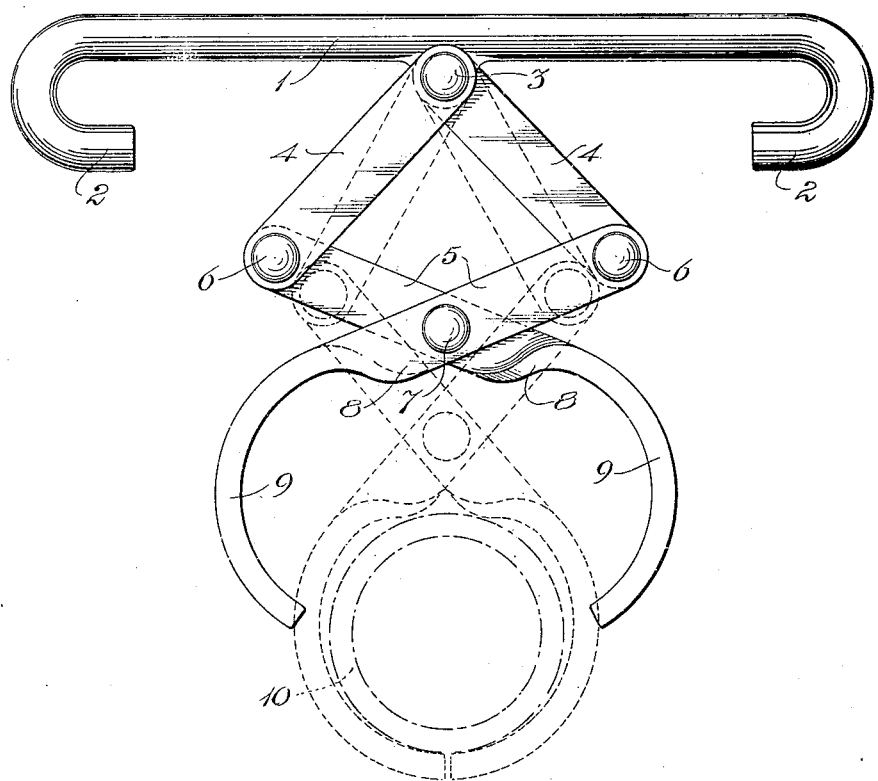
Figure 2:
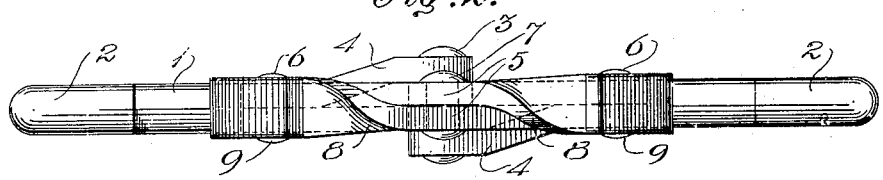

Other objects and advantages of the invention will be apparent from the following description when taken in connection with the accompanying drawings, in which:

Figure 1 is a front elevation of the device, the dotted line position showing the same attached to a hose, and Figure 2 is a bottom plan view of the device.

Referring to the drawing more in detail, the numeral 1 indicates the rod or handle preferably formed of round stock. The handle 1 is formed with hooks 2 on the ends thereof which not only prevent the hands of operators from slipping off the handles, but also provide means for suspending the device from the shoulder of the fireman or other person expecting to have need for it. When suspended from the shoulder by one of the hooks 2 it is obvious that the other hook 2 may be engaged in a ring or other portion of the belt of the wearer. The hooks 2 also provide a convenient means for suspending the hose from the rung of a ladder.

Pivoted on the rod 1 intermediate its ends, as indicated at 3, is a pair of links 4, and these links have their free ends pivoted to the ends of the hook members 5 at the points designated by numerals 6. The hook members 5 are pivotally connected at 7, and just below the pivot point 7 the hook members are provided with a 90° twist indicated by numerals 8, whereby the hook portions 9 present gripping surfaces of substantial area to the outer wall of the hose.

In operation the bar 1 may be grasped by one or two persons, and after properly positioning the hooks 9 with respect to the hose 10 the rod 1 is raised, thereby causing the hook members 9 to firmly grasp the hose. The hose may then be carried or dragged to the place desired and then suspended by means of the hooks 2.

While the device is intended primarily for use in connection with fire hose, it will be understood that the same is equally well adapted for use with pipes, logs and similar cylindrical objects.

In accordance with the patent statutes, we have described what we now believe to be the best embodiment of the invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. A hose support and carrier, including a plain, elongated bar having its ends bent to provide hooks, a pair of links pivoted to said bar intermediate the ends thereof, and a pair of cross pivoted hook members stamped up from flat stock each hook member having one of its ends pivotally connected to one of the links.

2. A hose support and carrier, comprising a plain, elongated bar of round stock having downturned hooks formed on the ends thereof, a pair of links pivoted to said bar at its middle portion, a pair of cross pivoted hook members each having one of its ends pivotally connected to one of the links, each of said hook members being formed with a twist intermediate its ends, whereby the hook will present a flattened surface to the hose.

MAURICE M. McGEARY.
ARTHUR J. DIEFENBACH.